United States Patent
Ginzburg et al.

(10) Patent No.: US 9,409,770 B2
(45) Date of Patent: Aug. 9, 2016

(54) STORAGE SYSTEMS FOR ADSORBABLE GASEOUS FUEL AND METHODS OF PRODUCING THE SAME

(75) Inventors: Yuri Ginzburg, Ginot-Shomron (IL); Vadim Beilin, Raanana (IL); Baruch Foux, Jerusalem (IL); Lev Zaidenberg, Raanana (IL)

(73) Assignee: ANGSTORE TECHNOLOGIES LTD, Ashkelon (IL)

( * ) Notice: Subject to any disclaimer, the term of this patent is extended or adjusted under 35 U.S.C. 154(b) by 1470 days.

(21) Appl. No.: 11/568,187

(22) PCT Filed: Apr. 21, 2005

(86) PCT No.: PCT/IL2005/000439
§ 371 (c)(1),
(2), (4) Date: May 3, 2009

(87) PCT Pub. No.: WO2005/102500
PCT Pub. Date: Nov. 3, 2005

(65) Prior Publication Data
US 2009/0229555 A1    Sep. 17, 2009

(30) Foreign Application Priority Data

Apr. 21, 2004 (IL) .......................... 161546

(51) Int. Cl.
*F17C 11/00* (2006.01)
*B82Y 30/00* (2011.01)
(Continued)

(52) U.S. Cl.
CPC .............. *B82Y 30/00* (2013.01); *B01D 53/0407* (2013.01); *C01B 3/001* (2013.01);
(Continued)

(58) Field of Classification Search
USPC ........... 206/0.7; 502/526; 423/658.2; 95/116, 95/143; 96/108, 121, 126–128, 130, 133, 96/146, 147; 220/562, 564
See application file for complete search history.

(56) References Cited

U.S. PATENT DOCUMENTS

| 4,444,727 A | * | 4/1984 | Yanagihara et al. .......... 422/223 |
| 4,599,867 A | | 7/1986 | Retallick |

(Continued)

OTHER PUBLICATIONS

"A New Method of Storage and Transportation" By LL Vasiliev et al,; Published in Minutes of Seminar Heat Pipes, heat pumps and refrigerators—Minsk 2000.

*Primary Examiner* — Frank Lawrence
(74) *Attorney, Agent, or Firm* — Michael J. Feigin, Esq.; Feigin & Fridman LLC

(57) ABSTRACT

A storage system for an absorbing gas including a plurality briquette units situated within the storage tank is disclosed. In some embodiments, each briquette unit includes a liner or open vessel, and compressed gas-absorbing particulate matter associated with the liner for external support. In some embodiments, the liner or vessel maintains the form of the briquette unit. The liner or vessel do not form a pressure tight vessel, and in some embodiments, the local pressure rating of the liner or vessel is less than the gas pressure within the storage tank. Exemplary gas-absorbing materials include but are not limited to methane and hydrogen adsorbing materials such as activated carbon, zeolite, and other appropriate hydrocarbon gas and/or hydrogen adsorbing materials. Optionally, each briquette unit includes a wrapper for preventing circulation of said particulate matter within the storage tank. Optionally, the storage system includes a mechanism for supplying or removing heat to at least one briquette unit. Furthermore, a method for manufacturing any of the aforementioned gas storage systems is disclosed. Some embodiments of the present invention provide methane-powered motor vehicles including but not limited to automobiles, buses, trucks and ships including a storage system with compressed methane-adsorbing particulate matter.

27 Claims, 8 Drawing Sheets

(51) Int. Cl.
    *B01D 53/04*     (2006.01)
    *C01B 3/00*     (2006.01)
    *F17C 1/00*     (2006.01)
    *F17C 1/14*     (2006.01)
    *F17C 1/16*     (2006.01)
    *B01D 53/053*     (2006.01)

(52) U.S. Cl.
CPC ............... *C01B 3/0021* (2013.01); *F17C 1/00* (2013.01); *F17C 1/14* (2013.01); *F17C 1/16* (2013.01); *F17C 11/005* (2013.01); *F17C 11/007* (2013.01); *B01D 53/0438* (2013.01); *B01D 53/0446* (2013.01); *B01D 53/053* (2013.01); *B01D 2253/102* (2013.01); *B01D 2253/108* (2013.01); *B01D 2253/11* (2013.01); *B01D 2253/25* (2013.01); *B01D 2257/108* (2013.01); *B01D 2257/7025* (2013.01); *B01D 2259/40088* (2013.01); *B01D 2259/414* (2013.01); *B01D 2259/4525* (2013.01); *B01D 2259/4566* (2013.01); *F17C 2201/01* (2013.01); *F17C 2201/0104* (2013.01); *F17C 2201/0128* (2013.01); *F17C 2201/0152* (2013.01); *F17C 2201/0157* (2013.01); *F17C 2201/0171* (2013.01); *F17C 2201/05* (2013.01); *F17C 2201/052* (2013.01); *F17C 2201/054* (2013.01); *F17C 2201/056* (2013.01); *F17C 2201/058* (2013.01); *F17C 2203/0604* (2013.01); *F17C 2203/0636* (2013.01); *F17C 2203/0658* (2013.01); *F17C 2209/221* (2013.01); *F17C 2209/227* (2013.01); *F17C 2209/228* (2013.01); *F17C 2221/012* (2013.01); *F17C 2221/033* (2013.01); *F17C 2223/0123* (2013.01); *F17C 2223/035* (2013.01); *F17C 2260/042* (2013.01); *F17C 2270/0105* (2013.01); *F17C 2270/0168* (2013.01); *F17C 2270/0171* (2013.01); *F17C 2270/0176* (2013.01); *F17C 2270/0178* (2013.01); *Y02C 20/20* (2013.01); *Y02E 60/321* (2013.01); *Y02E 60/325* (2013.01); *Y02P 20/156* (2015.11); *Y10T 29/49622* (2015.01)

(56) References Cited

U.S. PATENT DOCUMENTS

| | | | | |
|---|---|---|---|---|
| 4,609,038 | A * | 9/1986 | Ishikawa et al. | 165/104.12 |
| 4,667,815 | A * | 5/1987 | Halene | 206/0.7 |
| 4,744,221 | A | 5/1988 | Knollmueller | |
| 5,385,876 | A * | 1/1995 | Schwarz et al. | 502/80 |
| 5,987,895 | A * | 11/1999 | Nishimura et al. | 62/46.2 |
| 6,019,823 | A | 2/2000 | Tischler et al. | |
| 6,318,453 | B1 * | 11/2001 | Ovshinsky et al. | 165/104.12 |
| 6,432,176 | B1 * | 8/2002 | Klos et al. | 96/117.5 |
| 6,660,063 | B2 | 12/2003 | Tom et al. | |
| 6,993,888 | B2 * | 2/2006 | Yang et al. | 53/447 |
| 2005/0051294 | A1 * | 3/2005 | Fujita et al. | 165/10 |

* cited by examiner

STORAGE SYSTEMS FOR ADSORBABLE GASEOUS FUEL AND METHODS OF PRODUCING THE SAME

FIELD OF THE INVENTION

The present invention relates generally to storage and dispensing systems in which specific absorbable gases, including but not limited to gaseous fuel, gaseous hydrocarbons, methane, and hydrogen, are sorptively retained by a solid sorbent medium.

BACKGROUND OF THE INVENTION

Natural gas (NG) is a promising alternative fuel. Unfortunately, natural gas is often difficult to store, and natural gas storage requires extremely high pressures and/or at very low temperatures. To date, two techniques for NG storage are commercially used.

The first storage technique is to store Compressed Natural Gas (CNG) under extremely high pressure conditions such as, for example, 200-250 bars at normal ambient temperature. These pressures require specially designed reinforced tanks, which are bulky and heavy. Furthermore, gas compression requires an expensive and multi-stage high-pressure compression process. High-pressure vessels containing compressed natural gas are known to present a significant fire and/or detonation hazard.

Alternatively, Liquefied Natural Gas (LNG) is refrigerated to −161.5.degree. C. and stored at a more moderate pressure. This technique entails use of complex and expensive liquefaction equipment and thermos-like tanks as well as significant energy consumption (15-25% of the original gas energy content) for both liquefaction and regasification of the gas.

Both CNG and LNG technologies employ cylindrical or spherical storage tanks that lead to waste of space between neighboring vessels in arrays.

absorbed natural gas (ANG) is a promising alternative to these aforementioned technologies for natural gas storage since the same quantity of NG can be stored at much lower pressure (35-40 bars), at room temperature and in a thinner walled tank with a lower pressure rating. Furthermore, this method does not require expensive and cumbersome gas compression or liquefaction equipment, insulated tanks, etc. ANG tanks could have any configuration in contrast with exclusively cylindrical forms of NG high-pressure tanks. Thus, the tanks could be tailored to fit odd spaces, such as today's gasoline or diesel tanks in cars.

Salient features of ANG technology include high sorbent property and the thermal management system embedded within the vessel. ANG systems are thus characterized by the sorbent's ability for uptake and delivery of a maximum gas quantity. To date, sorbents based on activated carbon have shown promise. It is desirable to maximize the microporosity (fraction of the micropore volume) of the sorbent material so that the space occupied by the atoms of the microporous material and the space wasted by poor packing of the crystallites are both minimized.

For the specific case of adsorptive storage of natural gas, the efficacy of the absorbent in majority cases is measured by the adsorption capacity for gas per unit volume of absorbent at a specified pressure and room temperature. The adsorption capacity per unit volume of absorbent can be calculated by $V_v = (V_w)(d)$, where Vw is the adsorption capacity of the material per unit mass of absorbent, and d is the density of the absorbent pellets. Upon compacting the material, the density d is increased, and so the adsorption capacity per unit volume $V_v$ also increases.

Primarily activated carbon sorbent is supplied in particulate matter such as powder or granulated powder form. Since volumetric performance is deciding factor in majority applications, especially for on-board fuel tanks, the sorbent needs to be compacted (immobilized).

Direct placement of the packed absorbent carbon into the storage vessel with a sufficient sorbent density has proven to be a formidable task. Briquetting, or immobilizing, the carbon was considered as an alternative. The advantages of briquetting were twofold Immobilized carbon would not settle and/or circulate in the storage vessel and would be less likely to be carried in the gas stream during discharge. Use of immobilized carbon would also allow the vessel to be packed more easily to a higher density than using just granular or powdered carbon.

Therefore, currently generally adopted tank design is based on multicell concept (FIG. 1), where the tank housing 1a includes of plurality of cells 6 and each cell in itself serves both as a pressurized vessel for the gas storing and as a container for sorbent briquettes 3a. This concept faces two serious difficulties.

The first difficulty is the complex design of the tank housing, whose manufacturing requires special profiling using expensive cumbersome equipment. The second is requirement that of high mechanical strength of the sorbent blocks.

In order to imbue sorbent blocks with the requisite mechanical strength, a significant quantity of binding medium is added to the sorbent. The use of a chemical binder, however, detracts from absorbent performance, because the binder tends to block methane access to the micropores of the carbon resulting in reduced storage and delivery. Furthermore, addition of binding material increases the size of the sorbent blocks without concomitantly increasing the amount of gas absorbent material within each block.

There is an ongoing need for absorbing gas storage systems including mechanically stable sorbent units within a storage tank. Current techniques do not provide viable solutions to this ongoing need, since on the one hand high-strength briquettes require strong binding material, and on other hand this binder concomitantly decreases sorbent uptake. Other technology for compensating for performance degradation associated with chemical binder use is very complex and expensive and still does not give desired results.

Furthermore, there is an ongoing need for absorbing gas storage systems designed to reduce the amount of time required to absorb and/or desorb adorable gas such as methane onto and/or from the sorbent, in order to reduce the time of filling the tank and/or removing the gas from the tank. It is noted that adsorption of methane gas onto the sorbent is an exothermic process, and thus as the gas is absorbed to the sorbent the ambient temperature within the storage tank increases, diminishing the rate of methane uptake by the sorbent. Similarly, desorption of gas reduces the ambient pressure and temperature within the tank, concomitantly increasing the time necessary to deliver absorbed gas from the tank. There is an ongoing need for systems and methods for removing heat from the tank during gas adsorption and for delivering heat to the tank during gas desorption. Preferably, the delivery and removal of heat should be relatively uniform throughout the tank in order to provide optimal conditions for all sorbent units within the vessel.

The following patents and published patent document, each of which are incorporated herein by reference, provide potentially relevant background art:

U.S. Pat. No. 6,019,823 discloses solid-phase physical sorbent medium holding absorbed fluid is provided in a cartridge, for use in a sorbent-based fluid storage and dispensing system;

SUMMARY OF THE INVENTION

The aforementioned needs are satisfied by several aspects of the present invention.

A gas storage system is now disclosed including a storage tank, a gaseous fuel including an absorbing gas stored in the storage tank at an given total gas pressure, and a plurality of briquette units situated within the storage tank for absorbing the gaseous fuel.

In some embodiments, each briquette unit includes an at least partially open vessel formed or constructed such that any sealing of this open vessel produces a closed vessel with a pressure rating that is less than the given total gas pressure within the tank, and compressed particulate matter for absorbing the gaseous fuel situated within the vessel.

Exemplary gaseous fuels include but are not limited to gaseous hydrocarbons such as methane gas and hydrogen gas.

In some embodiments, the compressed particulate matter includes methane absorbing compressed particulate matter such as activated carbon. Alternatively, the compressed particulate matter includes hydrogen-absorbing compressed particulate matter such as reversible metal hydrides.

It is noted that the open vessels or liners of the briquette units provided by embodiments of the present invention provide external support to the compressed gaseous fuel-absorbing powder, obviating the need for binder additives. Nevertheless, the open vessels or liners of the present invention are not required to have any extra mechanical strength beyond what is necessary to contribute to maintaining the form of the briquette units. Thus, the open vessels or liners of the present invention are not pressure tight vessels, nor are the open vessels or liners required to have a mechanical properties associated with pressure tight vessels for bearing a pressure difference equal to or approximately equal to the total ambient pressure within the external storage tank or the partial pressure of the gaseous fuel. Thus, unlike systems which provide a pressurized tank within a pressurized tank, the gas storage systems of the present invention do not impose these stringent requirements on the briquette units, thereby providing a cost savings in the cost of the liner, and thereby allowing for thinner liners which waste less space.

In some embodiments, any sealing of the open vessel produces a closed vessel with a pressure rating that less than a partial pressure of the gaseous fuel.

In some embodiments, any sealing of the open vessel produces a closed vessel with a pressure rating that is at least 50% less than a pressure selected from the group consisting of the given total gas pressure and a partial pressure of the absorbing gaseous fuel.

In some embodiments, there is a clearance between an outer surface of the vessel and an inner surface of the storage tank. Not wishing to be bound by any particular theory, it is noted that this clearance provides for thermal insulation of the briquette units from the external environment outside of the storage tank.

In some embodiments, the partially open vessel includes a plurality of apertures for diffusion of absorbing gaseous fuel to the compressed particulate matter.

In some embodiments, the compressed particulate matter has been compressed to form an at least partially self supporting aggregate.

In some embodiments, the compressed particulate matter has been compressed beyond a pressure equal to a local pressure or open vessel pressure rating of the open vessel.

Optionally, each briquette unit includes a wrapper associated with the vessel to form a gas porous enclosure of particulate matter for preventing circulation of the particulate matter.

In some embodiments, the compressed particulate matter includes a chemical binder material.

In some embodiments, the compressed particulate matter includes at least one of compressed powder and compressed granules.

In some embodiments, the storage system further comprises a mechanism for supplying heat to or removing heat from at least one briquette unit.

There are no restrictions on the heat transfer mechanism. In some embodiments, the heat transfer mechanism includes at least one channel for transporting gas and/or fluid, where the channel traverses through a briquette unit.

In some embodiments, the heat transfer mechanism includes at least one heat transferring carrier selected from the group consisting of a gas channel, a heat pipe and a fluid channel.

In some embodiments, the heat transferring carrier plays a role of a bearing element for the open vessel.

In some embodiments, the bearing element bears the vessel directly.

In some embodiments, the bearing element bears the vessel through a mating part including a good heat conductor.

In some embodiments, the mechanism includes at least one of a heat source and a heat sink placed outside of the storage tank.

In some embodiments, at least one of the heat source and heat sink can be represented as an electric heater, a liquid fuel heater, a gaseous fuel heater, an air heat exchanger and a water heat exchanger.

In some embodiments, the compressed particulate matter is situated within the vessel so that there is no clearance between an inner surface of the vessel and an outer surface of the compressed particulate matter. Not wishing to be bound by any particular theory, it is noted that this direct contact between the compressed particulate matter and surrounding heat conducting vessel which the particulate matter is place serves to enhance the transfer of heat to and from the briquette unit, thereby bolstering the effectiveness of the heat transfer mechanism.

It is now disclosed for the first time a gas storage system including a storage tank having a pressure rating and a plurality of briquette units situated within the storage tank, each briquette unit including an at least partially open vessel constructed such that any sealing of the open vessel produces a closed vessel with a pressure rating that is less than the pressure rating of the storage tank, and compressed particulate matter for absorbing a gaseous fuel selected from the group consisting of a gaseous hydrocarbon fuel and hydrogen situated within the vessel.

In some embodiments, the open vessel is formed such that any sealing of the open vessel produces a closed vessel with a pressure rating that is at least 20% less than the pressure rating of the storage tank.

It is now disclosed for the first time a gas storage system including a storage tank and a plurality of briquette units situated within the storage tank.

In some embodiments, each briquette unit includes a liner and compressed gaseous fuel absorbing particulate matter, where the liner includes a plurality of apertures for as diffusion and provides external support to the compressed particulate matter.

In some embodiments, the gaseous fuel absorbing particulate matter is compressed to form an at least partially self supporting aggregate.

In some embodiments, the liner contributes to maintaining the form of the briquette units.

In some embodiments, for at least one the briquette unit, a majority of an inner surface of the liner contacts a surface of the compressed particulate matter.

In some embodiments, the liner does not form part of a pressure tight vessel.

It is now disclosed for the first time a gas storage system including a storage tank having a pressure rating; and a plurality of briquette units situated within the storage tank. In some embodiments, each briquette unit includes an at feast partially open vessel, and particulate matter for absorbing a gaseous fuel selected from the group consisting of a gaseous hydrocarbon fuel and hydrogen situated within the vessel, wherein the particulate matter has been compressed beyond a pressure that is equal to a local pressure rating the of the open vessel.

It is now disclosed for the first time a gas storage system including a storage tank and a plurality of briquette units situated within the storage tank. Each briquette unit includes compressed gaseous fuel absorbing particulate matter, a liner providing external support to the compressed particulate matter, and a wrapper associated with the liner to form a gas porous enclosure of the particulate matter for preventing circulation of the particulate matter.

It is now disclosed for the first time a gas storage system including a storage tank and a plurality of briquette units situated within the storage tank. Each briquette unit includes compressed gaseous fuel absorbing particulate matter, a liner providing external support to the compressed particulate matter, and a wrapper associated with the liner to form a Gas porous enclosure of the particulate matter for preventing circulation of the particulate matter.

It is now disclosed for the first time a gas storage system including a storage tank and a plurality of briquette units situated within the storage tank. Each briquette unit includes compressed gaseous-fuel absorbing particulate matter, and a gas porous enclosing liner for providing external support to the compressed particulate matter.

It is now disclosed for the first time a gas storage system including a storage tank and a plurality of briquette units situated within the storage tank. Each briquette unit includes compressed gaseous-fuel absorbing particulate matter, a liner for providing external support to the compressed particulate matter, and at least one channel through the briquette unit for fluid or gas flow. It is noted that fluid or gas flow through the channel is useful to transport heat to or remove heat from the briquette unit.

Exemplary applications of the absorbed natural gas technology of embodiments of the present invention include but are not limited to as an onboard gas tank for motorized vehicles such as trucks, automobiles, buses and armored vehicles, as a virtual pipeline for commercial and household consumers, and for marine gas transportation.

It is now disclosed for the first time a motorized vehicle including a motor powered by a gaseous fuel selected from the group consisting of a gaseous hydrocarbon, methane and hydrogen, an on-board gas storage system including a storage tank and a plurality of briquette units situated within the storage tank, and a mechanism for delivering said gaseous fuel from the gas storage system to the motor. In some embodiments, each briquette unit includes a liner and compressed particulate matter for absorbing the gaseous fuel, where the liner provides external support to the compressed particulate matter.

It is now disclosed for the first time a method of assembling a system for storage of a gaseous fuel selected from the group consisting of a gaseous hydrocarbon, methane and hydrogen. The presently disclosed method includes providing gaseous fuel-absorbing particulate matter within a supportive liner within a mold or rigid mold, forming a briquette from the particulate matter within the supportive liner, removing the briquette associated with said supportive liner from said mold, and deploying the briquette associated with the supportive liner in a storage tank.

In some embodiments, the stage of forming includes applying a compressive force to the gas fuel absorbing particulate matter to form the briquette.

After the stage of deploying, the method optionally further includes adding gaseous fuel to the storage tank to absorb on the briquette.

It is now disclosed for the first time a method of assembling a system for storage of a gaseous fuel selected from the group consisting of a gaseous hydrocarbon, methane and hydrogen. The presently disclosed method includes providing gaseous fuel-absorbing particulate matter within a supportive liner, forming a briquette from the particulate matter within the supportive liner, and deploying the briquette associated with the supportive liner in a storage tank. In some embodiments, the stage of deploying includes inserting the briquette into the tank, and the briquette is substantially free of absorbed gaseous fuel at a time of the inserting.

After the stage of deploying, the method optionally further includes adding gaseous fuel to the storage tank to absorb on the briquette.

These and further embodiments will be apparent from the detailed description and examples that follow.

DETAILED DESCRIPTION OF THE INVENTION

It has been discovered in accordance with certain embodiments of the present invention that a storage tank containing one or more briquette units, where each briquette unit includes compressed gas-absorbing particulate matter associated with a liner for maintaining the form of the briquette unit, is a useful system for storage of absorbing gases such as natural gas and hydrogen. Although the present invention does not preclude the use of binder additive such as a polymer binder or other chemical binder for maintaining the integrity of the briquette units, it is noted that, surprisingly, such binder additives are not required for practice of the present invention. Not wishing to be bound by any particular theory, it is noted that in certain embodiments, binder materials can degrade absorbent performance of sorbent briquette units, and thus it is useful for the compressed particulate matter such as compressed absorbent granules or compressed absorbent powder to derive external support to maintain its form from a supportive envelop, liner, shell, sheath, vessel, or membrane.

Any appropriate material known in the art of any appropriate thickness for providing mechanical support for compressed particulate matter is appropriate for the liner or open vessel of the briquette unit. In some embodiments, the liner or open vessel includes a good heat conductor, such as, for example, a metal or heat conducting plastic. Exemplary material include but are not limited to aluminum, carbon steel, stainless steel, titanium, magnesium, zinc, and copper. In some embodiments, the liner or open vessel includes a poor or moderate heat conductor laminated with a material of higher heat conductivity.

Furthermore, it is noted that the principles of the present invention can be applied to any compressed gas absorbing particulate matter. Exemplary gas absorbing materials include but are not limited to carbon such as activated carbon, zeolite, clays, alumina, and silica gel.

Figure 1:
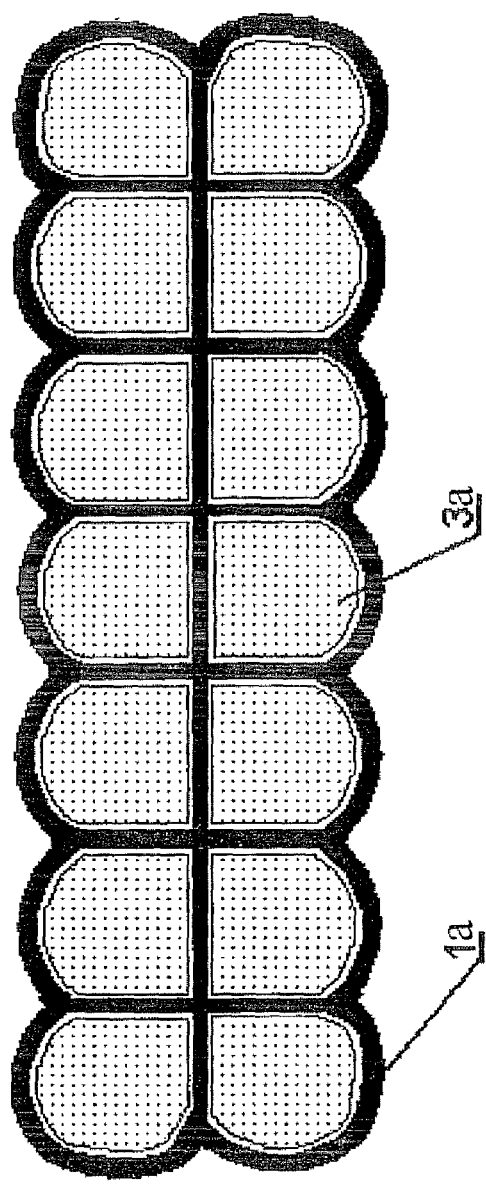
FIG. 1 provides a diagram of a multicell tank including of plurality of cells wherein each cell in itself serves both as a pressurized vessel for the gas storing and as a container for sorbent briquettes.
Figure 2:
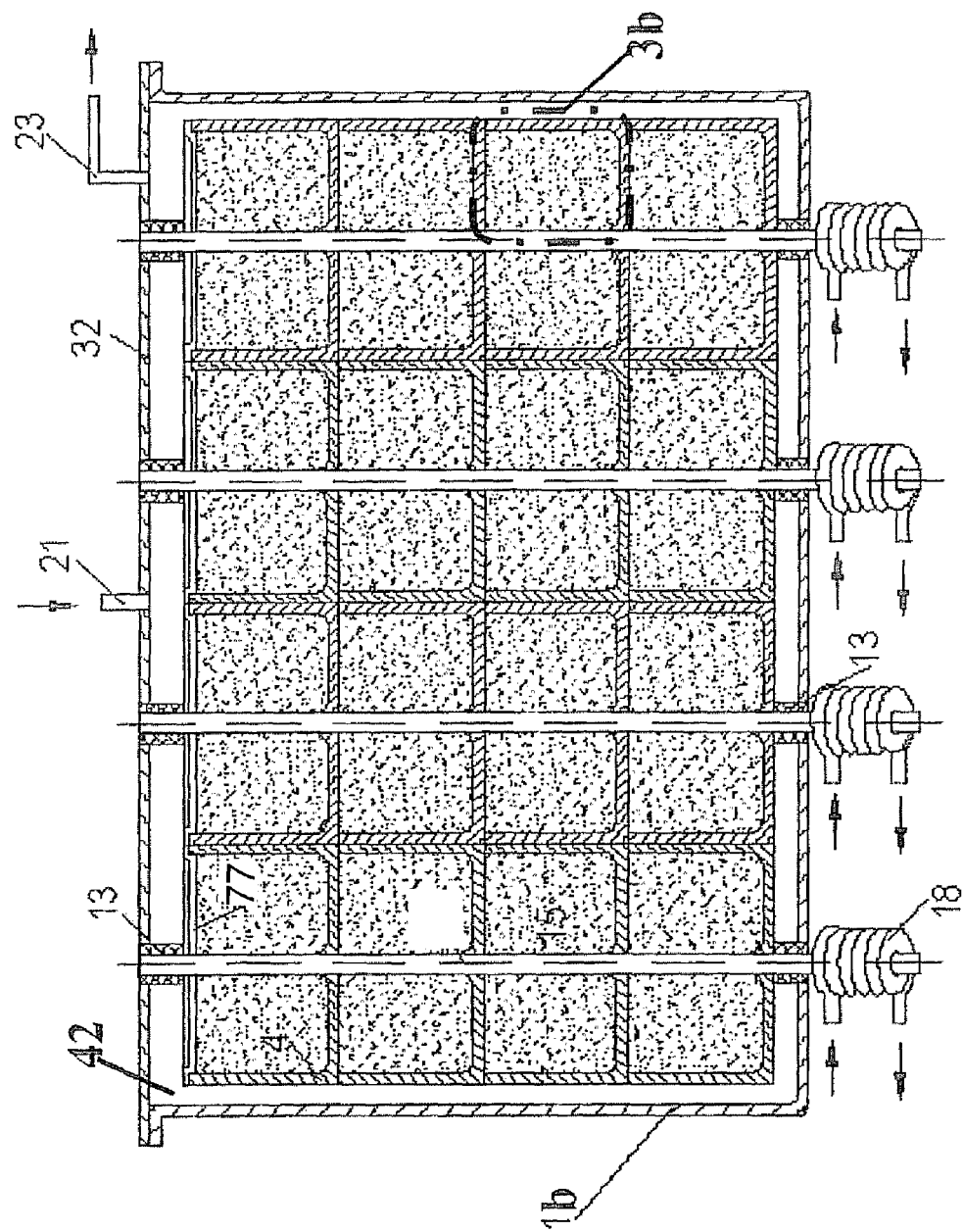
FIG. 2 provides a diagram of an absorbing gas storage system according to certain embodiments of the present invention.

Referring now to the drawings, FIG. 2 provides a diagram of an exemplary one volume storage tank for storage of absorbed gas such as absorbed natural gas. Although the exemplary storage tank 1 illustrated in FIG. 2 is a one volume tank, this is by no means a limitation of the present invention, and in some embodiments, a multicell tank storage tank is provided.

There is no particular restriction on the material from which the tank housing 1b is constructed. Exemplary materials include but are not limited to metal, composite, polymer materials and combinations thereof.

As illustrated in FIG. 2, the tank housing 1b is a unitized block of prismatic form, which is closed from one side with cap 32. A plurality of briquette units including compressed particulate matter is located inside the tank housing 1b with optional clearance space 42 between the outside surface of the shells or liners and the inside surface of the tank housing Not wishing to be bound by any particular theory, it is noted that the presence of the clearance space 42 helps to insulate the briquette units from the environment outside of the tank housing 1b.

It is noted that the briquette units as illustrated are selectively deployable within the tank housing 1b.

It will be appreciated that any shape and size is appropriate both for the storage tank 1b in which the plurality of briquettes are placed, in contrast to the CNG systems wherein a cylindrical tank shape is a requirement. Thus, the prismatic shaped tank 1b as illustrated is merely provided as an illustration, and is not intended as a limitation on the shape of the tank. Other appropriate shapes include but are not limited to spherical and cylindrical, and it is noted that the tank 1b in some embodiments includes combination of these of other shaped tanks. Similarly, any appropriate shape or size is appropriate for the open container or liner from which compressed particulate matter derives mechanical support. In some embodiments, the open container or liner is shaped so as to let a heat pipe or channel traverse through the briquette unit.

Each briquette unit 3b depicted in FIG. 2 includes a liner, shell or open vessel 4 of heat-conducting material and sorbent bed 15 including compressed particulate matter located inside the liner. Optionally, the liner includes a plurality of holes or apertures of relatively small diameter made in the vessel or liner walls (not shown) for great gas diffusion to the compressed particulate matter. Optionally, the upper portion of the vessel is closed by a lid 77 to prevent circulation of gas-absorbing particulate matter within the tank, though the closure does not need to form a hermetic sealing to produce a pressure tight vessel. Additionally or alternatively, the liner, envelope or vessel includes taco halves joined by welding, bonding or any other method, wherein the halves can be lower and upper halves or sidelong halves (for example, semi-cylindrical halves).

Alternatively or additionally, each briquette unit is enclosed with a wrapper for preventing circulation of said particulate matter in the tank, where any material for forming a gas porous enclosure is appropriate for the wrapper. Exemplary materials include but are not limited to fabric and netting. Not wishing to be bound by any particular theory, it is noted that for embodiments wherein there is a chance that the storage tank will be subjected to sudden motion, such as embodiments providing an on-board storage tank within a moving vehicle, it is useful to wrapper the briquette unit to prevent a situation wherein a chunk or bits of compressed particulate matter breaks away from the briquette unit and circulates throughout the storage tank.

Not only is there no specific requirement that the open vessel or liner associated with the compressed gas-absorbing particulate matter form a pressure tight system, but there is no limitation on the mechanical properties of the vessel or liner relative to the ambient pressure of any of the gases within the storage tank or relative to the pressure rating of the storage tank itself. Thus, in some embodiments, the local pressure-rating of every location in the liner or open vessel is less than the partial ambient pressure of absorbing gas within the external storage tank 1b and/or less than the total ambient pressure within the external storage tank in which the liner or open vessel is placed.

As used herein, a "local pressure rating" or "open vessel pressure rating" or "non closed vessel pressure rating" of an object with an inner surface and an outer surface such as a liner, membrane, and a open vessel is the greatest pressure rating of any closed pressure-tight vessel obtained by any sealing of object such that the entire object bears the force of any pressure differential between the inner and outer surface.

It is understood that any sealing of the object includes addition of material to the object such that the object forms a pressure-tight closed vessel, and that there is no restriction on the strength or thickness of the "sealing" material. The local pressure rating refers to the maximum pressure rating obtainable by forming a closed vessel. Furthermore, it is noted that the concept of sealing to form a closed vessel is not restricted to liners or open vessels that are mostly closed, but a local pressure rating of an object is defined as the maximum pressure rating obtainable by adding any amount of any material to form a closed object where the entire object itself bears the force of any pressure differential between the inner and outer surface.

Thus, there are no specific requirements for the local pressure rating of the liner or open vessel from which the compressed particulate matter derives external mechanical support. This allows for usage of liners or open vessels with a local pressure rating that is less than the ambient pressure of the absorbing gas and/or the total ambient pressure within the external storage tank.

This allows for usage of liners or open vessels with thin walls designed to withstand to local pressure rating that is much less than the ambient pressure of the absorbing gas and/or the total ambient pressure within the external storage tank.

This furthermore allows for the usage of liners or open vessels with a local pressure rating that is less than the pressure rating of the external storage tanks in which the briquette units are situated. The only restriction on the material and thickness of the liner or open vessel of the briquette unit is that sufficient external mechanical support is provided to the compressed particulate matter. Thus, in some embodiments, the local pressure rating of the liner or open vessel is significantly less, such as, for example, 20% less or 40% or 50% less or 60% less or 80% less, than the ambient gas pressure within the external storage tank or the partial pressure of absorbing gas within the external storage tank or the total ambient pressure within the external storage tank or the pressure rating of the external storage tank.

There is no specific restriction on the degree of compression characterizing the compressed particulate matter associated with the liner or situated in the open vessel. In particular embodiments, the compressed particulate matter has been compressed with a pressure beyond the local pressure rating of the supportive liner or the open vessel of the briquette unit.

Furthermore, it is noted that there is no restriction on the pressure rating of the external storage tank, the pressure of absorbing gas within the tank, or the total ambient pressure within the tank. In some exemplary embodiments, natural gas is stored in the storage tank at pressures between 10 bar and 50 bar. In some exemplary embodiments, natural gas is stored in the storage tank at pressures greater than 80 bar Similarly, there is no restriction upon the temperature at which the absorbing gas is stored in the briquette. In some exemplary embodiments, natural gas is stored at room temperature.

Exemplary Method for Manufacturing Briquette Units

There is no restriction on the process for manufacturing the aforementioned systems for storing absorbing gas. Nevertheless, embodiments of the present invention also provide a manufacturing process for forming this gas storage system.

Figure 3A:
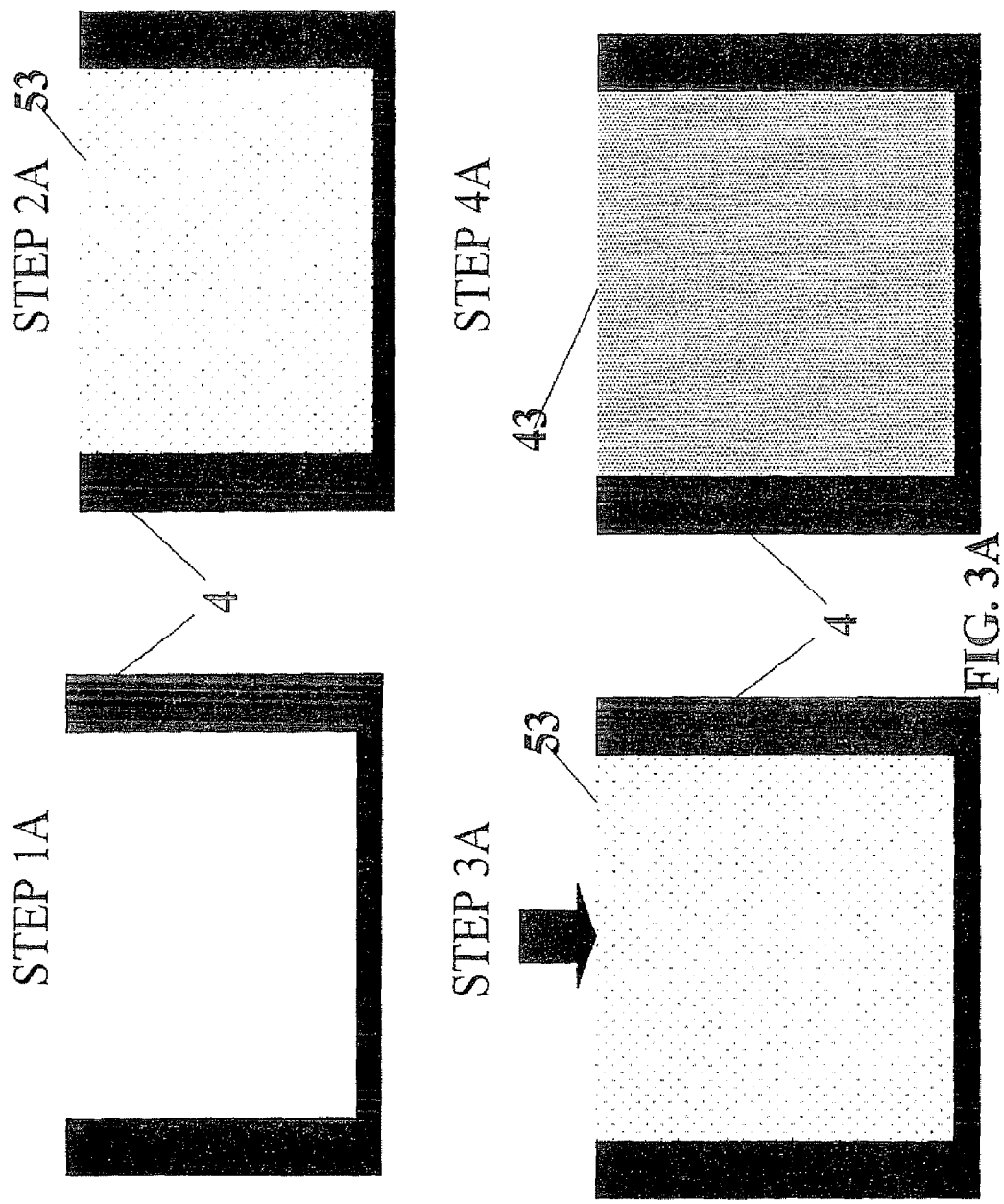
FIGS. 3A, 3B, and 3C provide diagrams of several exemplary manufacturing processes for creating an absorbing gas storage system.

FIG. 3A illustrates one exemplary manufacturing process including providing the liner, membrane or open vessel (4) (STEP 1A), situating gas absorbing particulate matter 54 such as natural gas absorbing powder within the liner or open vessel (STEP 2A), applying pressure to the gas particulate matter 53 (STEP 3A) in order to form compressed gas absorbing matter 43 (STEP 4A) Subsequently, a plurality of briquette units 3B including the compressed natural gas-absorbing particulate matter 43 are placed (FIG. 5C, STEP 5A) into a storage tank 1B.

Figure 3B:
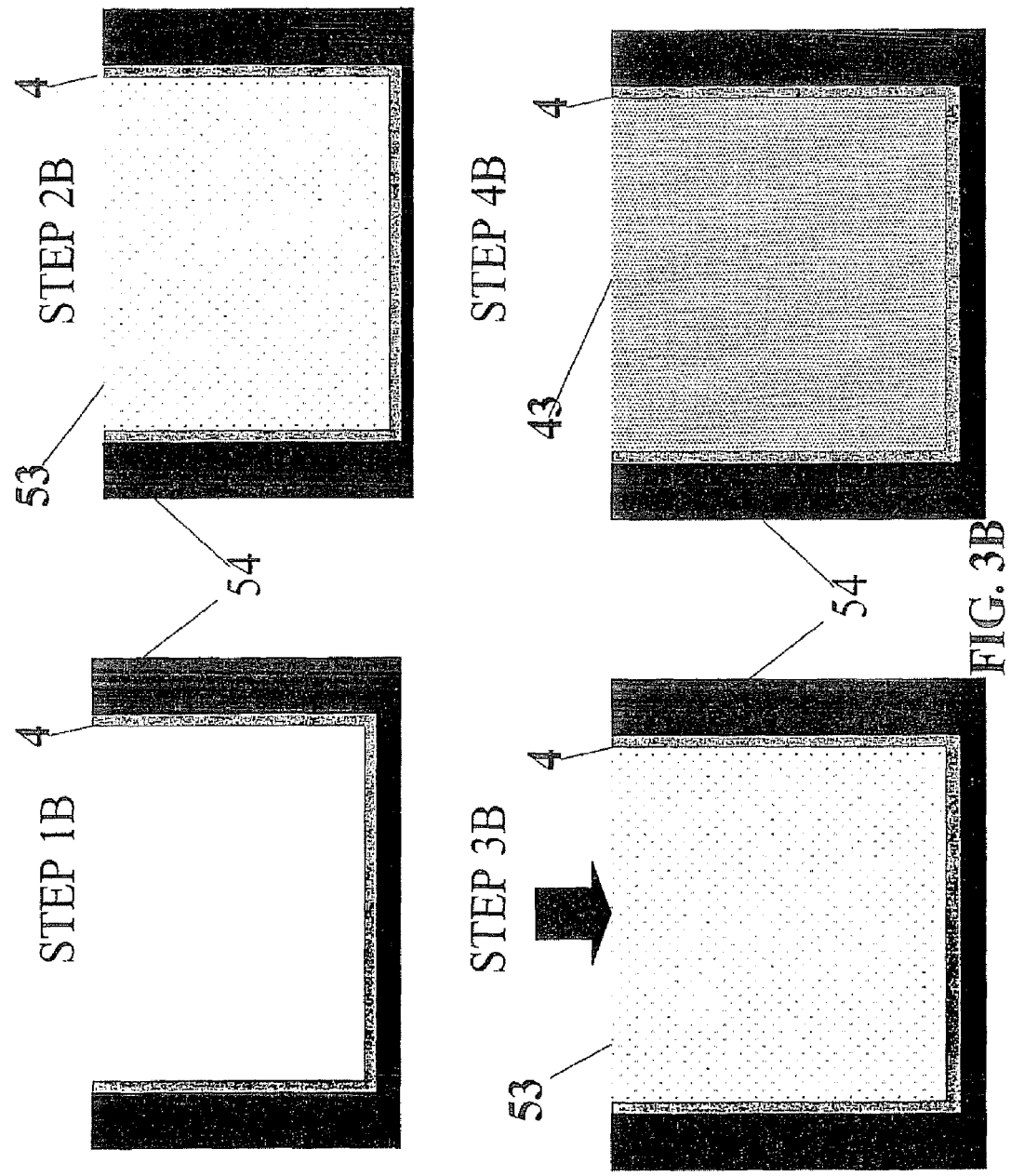
Figure 3C:
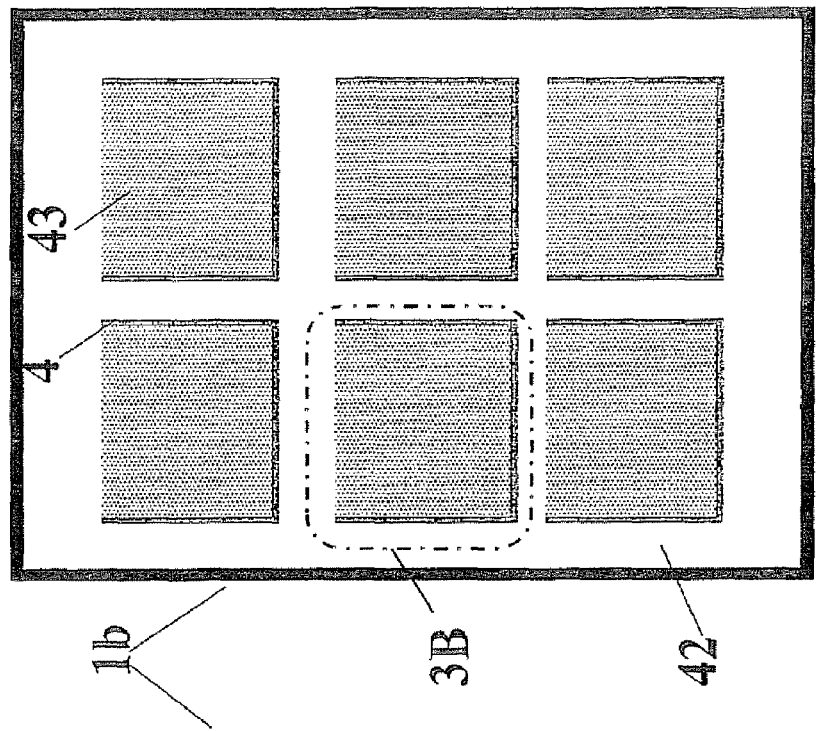
Figure 3C:
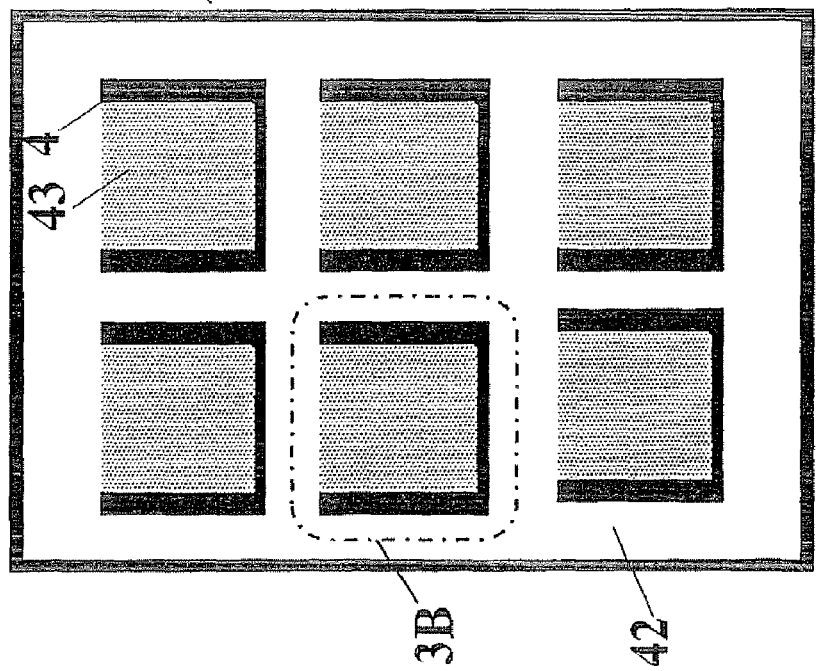

FIG. 3B illustrates an alternative exemplary manufacturing process including providing the liner or open vessel (4) (STEP 1B) within a reinforcing mold 54, situating gas absorbing particulate matter 53 such as natural gas absorbing powder within the liner or open vessel (STEP 2B), applying pressure to the gas particulate matter 53 (STEP 3B) in order to form compressed gas absorbing matter 43 (STEP 4B). Subsequently, a plurality of briquette units 3B including the compressed natural gas-absorbing particulate matter are placed (FIG. 3C, STEP 5B) into a storage tank 1B.

Optionally, the liner or open vessel 4 provided is able to withstand the pressure applied in STEP 3A without suffering permanent deformation. It is noted that although the external mold 53 of the process in FIG. 3B provided external support for the liner or open vessel 4 during the step whereby pressure is applied (STEP 3B), there is no requirement that the external mold 53 of FIG. 3B be subsequently placed in the external storage tank 1B, especially if the liner or open vessel suffices to provide the necessary mechanical support for the compressed gas-absorbing matter of the briquette unit.

It is further noted that the shapes illustrated in FIGS. 2-3 are merely exemplary shapes, and that any appropriate shape for the liner or open vessel 4 of the briquette unit is appropriate for the practice of the present invention. Furthermore, it is noted that there is no specific size restriction whatsoever on the liner or open vessel 4. In one specific exemplary embodiment wherein compressed activated carbon powder is used to absorb methane gas in a tank embedded in an automobile, the volume of the compressed particulate matter in each briquette unit is about 600 cm.sup.3.

Figure 4:
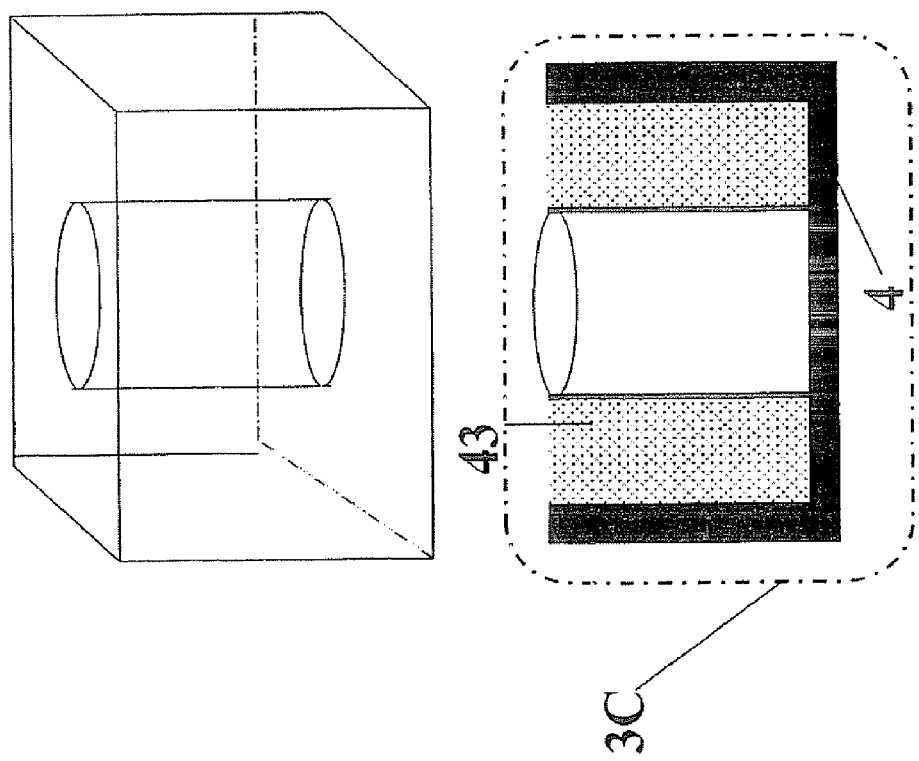
FIG. 4 provides a diagram of an exemplary mold system for compressing particulate matter such that a channel traverses the compressed particulate matter.

FIG. 4 provides a diagram of an exemplary mold system for compressing particulate matter such that a channel traverses the briquette unit or the compressed particulate matter.

Figure 5:
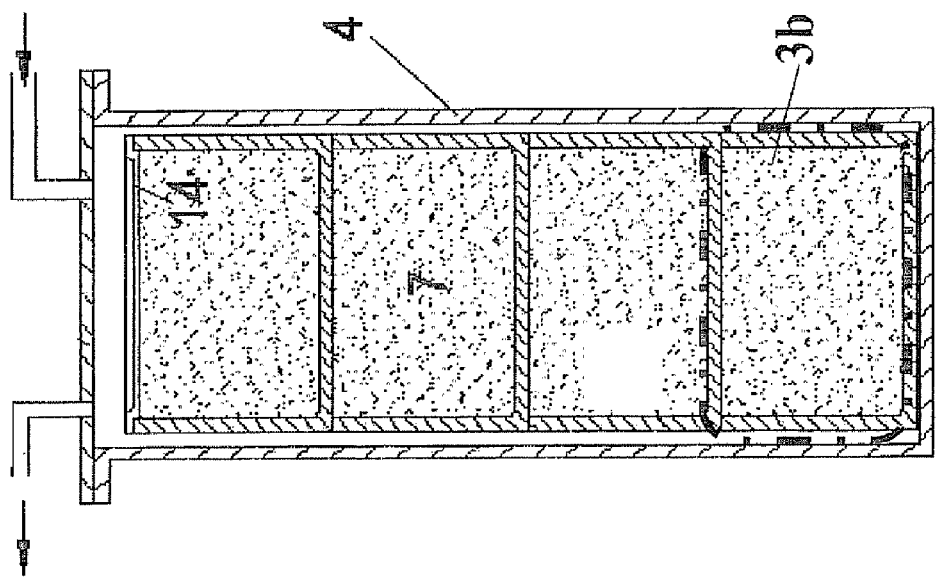
FIG. 5 provides a diagram of an absorbing gas storage system according to exemplary embodiments of the present invention.

FIG. 5 provides a diagram of an absorbing gas storage system according to exemplary embodiments of the present invention. In some embodiments, the storage system of FIG. 5 is appropriate for on board natural gas storage in a motorized vehicle.

Figure 6:
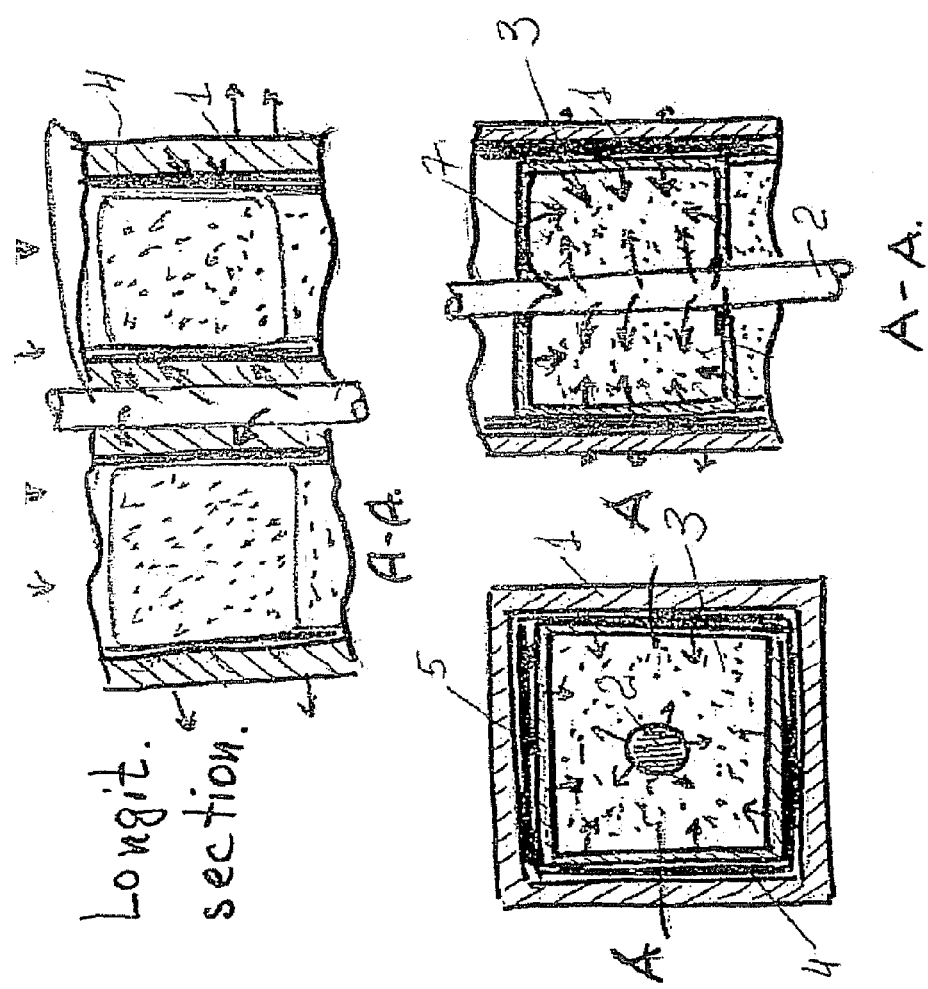
FIG. 6 provides a diagram of an exemplary heat transfer system according to exemplary embodiments of the present invention.

FIG. 6 provides a diagram of parts of an exemplary heat transfer system according to exemplary embodiments of the present invention.

In the description and claims of the present application, each of the verbs, "comprise" "include" and "have", and conjugates thereof are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

What is claimed is:

1. A gas storage system comprising: a) a storage tank; b) a gaseous fuel selected from the group consisting of hydrogen and gaseous hydrocarbon fuel stored in said storage tank at a given total gas pressure, said gas including an absorbing gas; and c) a plurality of briquette units situated within said storage tank, each said briquette unit including: i) an at least partially open vessel, said open vessel constructed such that any sealing of said open vessel produces a closed vessel with a pressure rating that is less than said given total gas pressure; ii) compressed particulate matter for absorbing said gaseous fuel situated within said vessel;

wherein said partially open vessel includes a plurality of apertures for diffusion of said absorbing gas to said particulate matter.

2. The system of claim 1 wherein said compressed particulate matter includes methane absorbing compressed particulate matter.

3. The system of claim 1 wherein said compressed particulate matter includes hydrogen absorbing compressed particulate matter.

4. The system of claim 1 wherein said gaseous hydrocarbon fuel includes methane.

5. The system of claim 1 wherein any sealing of said open vessel produces a closed vessel with a pressure rating that less than a partial pressure of said gaseous fuel.

6. The system of claim 1 wherein any sealing of said open vessel produces a closed vessel with a pressure rating that is at least 50% less than a pressure selected from the group consisting of said given total gas pressure and a partial pressure of said absorbing gas.

7. The system of claim 1 wherein there is a clearance between an outer surface of said vessel and an inner surface of said storage tank.

8. The system of claim 1 wherein said compressed particulate matter has been compressed to form an at least partially self supporting aggregate.

9. The system of claim 1 wherein said compressed particulate matter has been compressed beyond a pressure that is equal to a local pressure rating of said open vessel.

10. The system of claim 1 wherein said briquette units further include: iii) a wrapper associated with said vessel to form a gas porous enclosure of said particulate matter for preventing circulation of said particulate matter.

11. The system of claim 1 wherein said compressed particulate matter includes a chemical binder material.

12. The system of claim 1 wherein said compressed particulate matter includes at least one of compressed powder and compressed granules.

13. The system of claim 1 further comprising: d) a mechanism for supplying or removing heat to at least one said briquette unit.

14. The system of claim 13 wherein said mechanism includes at least one channel for transporting a substance selected from the group consisting of gas and fluid, said channel traversing through a said briquette unit.

15. The system of claim 13 wherein said mechanism includes at least one heat transferring carrier selected from the group consisting of a gas channel, a heat pipe and a fluid channel.

16. The system of claim 15 wherein said heat transferring carrier plays a role of a bearing element for said open vessel.

17. The system of claim 16 wherein said bearing element bears said vessel directly.

18. The system of claim 17 wherein said bearing element bears said vessel through a mating part including a good heat conductor.

19. The system of claim 13 wherein said mechanism includes at least one of a heat source and a heat sink placed outside of said storage tank.

20. The system of claim 19 wherein at least one of said heat source and said heat sink can be represented as an electric heater, a liquid fuel heater, a gaseous fuel heater, an air heat exchanger and a water heat exchanger.

21. The system of claim 1 wherein said compressed particulate matter is situated within said vessel so that there is no clearance between an inner surface of said vessel and an outer surface of said compressed particulate matter.

22. The system of claim 1 wherein said compressed particular matter includes at least one of activated carbon, zeolite, clays, alumina, and silica gel.

23. A gas storage system comprising: a) a storage tank having a pressure rating; and b) a plurality of briquette units situated within said storage tank, each said briquette unit including: i) an at least partially open vessel, said open vessel constructed such that any sealing of said open vessel produces a closed vessel with a pressure rating that is less than said pressure rating of said storage tank; ii) compressed particulate matter for absorbing a gaseous fuel selected from the group consisting of a gaseous hydrocarbon fuel and hydrogen situated within said vessel;

wherein said partially open vessel includes a plurality of apertures for diffusion of said absorbing gas to said particulate matter.

24. The gas storage system of claim 23 wherein any sealing of said open vessel produces a closed vessel with a pressure rating that is at least 20% less than said pressure rating of said storage tank.

25. A method of assembling a system for storage of a gaseous fuel selected from the group consisting of a gaseous hydrocarbon, methane and hydrogen, the method comprising: a) providing gaseous fuel-absorbing particulate matter within a supportive liner within a mold; b) forming a briquette from said particulate matter within said supportive liner; c) removing said briquette associated with said supportive liner from said mold; and d) deploying said briquette associated with said supportive liner in a storage tank.

26. The method of claim 25 wherein said stage of forming includes applying a compressive force to gas fuel absorbing particulate matter to form said briquette.

27. The method of claim 25 further comprising: d) after said deploying, adding gaseous fuel to said storage tank to absorb said gaseous fuel on a said briquette.

* * * * *